(12) United States Patent
Chai et al.

(10) Patent No.: US 9,328,500 B2
(45) Date of Patent: May 3, 2016

(54) INTEGRATED SYSTEM FOR TREATING AND RECYCLING RAINWATER

(71) Applicant: Chongqing University, Chongqing (CN)

(72) Inventors: Hongxiang Chai, Chongqing (CN); Hao Gong, Chongqing (CN); Suibing Shen, Chongqing (CN); Shen Li, Chongqing (CN); Boyu Zou, Chongqing (CN); Limin Li, Chongqing (CN); Xuebin Hu, Chongqing (CN); Qiang He, Chongqing (CN)

(73) Assignee: Chongqing University, Chongqing (CN)

( * ) Notice: Subject to any disclaimer, the term of this patent is extended or adjusted under 35 U.S.C. 154(b) by 193 days.

(21) Appl. No.: 14/072,829

(22) Filed: Nov. 6, 2013

(65) Prior Publication Data

US 2014/0124424 A1    May 8, 2014

(30) Foreign Application Priority Data

Nov. 6, 2012  (CN) .......................... 2012 1 0437904

(51) Int. Cl.

| | |
|---|---|
| *E03F 5/10* | (2006.01) |
| *C02F 3/32* | (2006.01) |
| *C02F 3/06* | (2006.01) |
| *B01D 17/02* | (2006.01) |
| *C02F 1/00* | (2006.01) |
| *C02F 3/10* | (2006.01) |
| *C02F 3/04* | (2006.01) |
| *C02F 103/00* | (2006.01) |

(52) U.S. Cl.
CPC ............ *E03F 5/103* (2013.01); *B01D 17/0211* (2013.01); *C02F 1/001* (2013.01); *C02F 3/06* (2013.01); *C02F 3/101* (2013.01); *E03F 5/101* (2013.01); *C02F 3/04* (2013.01); *C02F 3/105* (2013.01); *C02F 3/107* (2013.01); *C02F 3/32* (2013.01); *C02F 2103/001* (2013.01); *C02F 2303/24* (2013.01); *Y02W 10/15* (2015.05)

(58) Field of Classification Search
CPC ............. E03F 1/00; E03F 5/101; E03F 5/103; C02F 3/06; C02F 3/101; C02F 3/32; C02F 3/327; C02F 2103/001
USPC ................ 210/150, 151, 170.03, 602; 405/36
See application file for complete search history.

(56) References Cited

U.S. PATENT DOCUMENTS

| | | | | |
|---|---|---|---|---|
| 5,755,852 | A | * | 5/1998 | Northrop ....................... 210/602 |
| 5,893,975 | A | * | 4/1999 | Eifert ............................. 210/150 |
| 5,993,649 | A | * | 11/1999 | DeBusk et al. .......... 210/170.03 |

(Continued)

*Primary Examiner* — Christopher Upton
(74) *Attorney, Agent, or Firm* — Matthias Scholl, PC; Matthias Scholl

(57) ABSTRACT

An integrated system for treating and recycling rainwater in a residential community. The residential community includes low-lying land. The integrated system includes a primary channel for receiving and treating initial rainwater, a baffled water treatment pool, and a reservoir. The primary channel includes an external wall and an inner wall. The baffled water treatment pool includes a water inlet which is disposed on the inner wall of the primary channel. The reservoir includes a water inlet, a gravel filter layer, and an overflow wall. The primary channel, the baffled water treatment pool, and the reservoir are disposed in the low-lying land. The primary channel is annular and surrounds the baffled water treatment pool and the reservoir. The overflow wall of the reservoir cuts off the annular primary channel. The baffled water treatment pool and the reservoir are adjacent to each other and are divided by a shared wall.

7 Claims, 8 Drawing Sheets

(56) References Cited

U.S. PATENT DOCUMENTS

| | | | |
|---|---|---|---|
| 7,080,480 B2* | 7/2006 | Urban et al. | 210/170.03 |
| 7,967,979 B2* | 6/2011 | Grewal et al. | 210/150 |
| 8,287,728 B2* | 10/2012 | Kania et al. | 210/150 |
| 8,974,664 B2* | 3/2015 | Beatt et al. | 210/150 |
| 2011/0253238 A1* | 10/2011 | Burkhart et al. | 137/580 |
| 2011/0272349 A1* | 11/2011 | Rausch et al. | 210/602 |
| 2012/0091057 A1* | 4/2012 | Kent et al. | 210/602 |
| 2013/0175215 A1* | 7/2013 | Xi et al. | 210/150 |

* cited by examiner

INTEGRATED SYSTEM FOR TREATING AND RECYCLING RAINWATER

CROSS-REFERENCE TO RELATED APPLICATIONS

Pursuant to 35 U.S.C. §119 and the Paris Convention Treaty, this application claims the benefit of Chinese Patent Application No. 201210437904.1 filed Nov. 6, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to an integrated system for treating and recycling rainwater in a residential community.

2. Description of the Related Art

Rainwater is an important part in the urban and regional water cycle. Most rainwater planning and designs are just dedicated to rainwater drainage, and lack of supervisions and regulations for rainwater, let alone the use of rainwater resources. In the 1990s, U.S. stormwater management experts developed a multi-point micro-storm control strategy based on source control, namely low-impact development (LID). LID formulates a series of protective designs based on local conditions, focuses on bioretention, filtering and penetration, and net runoff storage to control the water amount and water quality of urban rainfall, and can effectively reduce the rainwater runoff, control the quality of rainwater, and recycle the rainwater comprehensively, with advantages of low construction and management costs, and exhibiting good ornamental effect. However, conventional rainwater treatment methods based on LID are incapable of purifying initial rainwater, incapable of processing flowing rainwater, and incapable of storing and recycling purified rainwater.

SUMMARY OF THE INVENTION

In view of the above-described problems, it is one objective of the invention to provide an integrated system for treating and recycling rainwater in a residential community that has good rainwater purification effect and can store, recycle, and fully utilize the rainwater resources.

To achieve the above objective, in accordance with one embodiment of the invention, there is provided an integrated system for treating and recycling rainwater in a residential community. The residential community comprises low-lying land. The integrated system comprises a primary channel for receiving and treating initial rainwater, a baffled water treatment pool, and a reservoir. The primary channel comprises an external wall close to the low-lying land and an inner wall opposite to the low-lying land, the external wall comprising a plurality of barrage-type water inlets and at least one opening for communicating with a rainwater pipe outlet. The baffled water treatment pool comprises a water inlet which is disposed on the inner wall of the primary channel. The reservoir comprises a water inlet, a gravel filter layer, and an overflow wall.

The primary channel, the baffled water treatment pool, and the reservoir are disposed in the low-lying land. The primary channel is annular and surrounds the baffled water treatment pool and the reservoir. The overflow wall of the reservoir cuts off the annular primary channel. The baffled water treatment pool and the reservoir are adjacent to each other and are divided by a shared wall. The baffled water treatment pool comprises a plurality of grid blocks which are separated by inner walls. Each of the grid blocks comprises gaps for allowing the rainwater to flow. Each of the grid blocks is covered with vegetation. A bottom of the baffled water treatment pool is provided with an improved soil layer and a lower packing layer. The gravel filter layer is disposed on a top of the reservoir. The water inlet of the reservoir is disposed on the shared wall of the baffled water treatment pool and the reservoir.

Advantages of the invention are summarized as follows. The primary channel can purify the initial rainwater preliminarily. The baffled water treatment pool prolongs the retention time of water in the integrated system thereby benefiting the penetration of the rainwater into the ground. The improved soil layer and the lower packing layer disposed at the bottom of the baffled water treatment pool can filter the rainwater thereby further purifying the rainwater. The reservoir can collect, purify, store, and recycle water. Thus, the integrated system of the invention has good rainwater purification effect, can store and recycle rainwater, thereby fully utilizing the rainwater resources.

DETAILED DESCRIPTION OF THE EMBODIMENTS

For further illustrating the invention, experiments detailing an integrated system for treating and recycling rainwater in a residential community are described below. It should be noted that the following examples are intended to describe and not to limit the invention.

Figure 1:
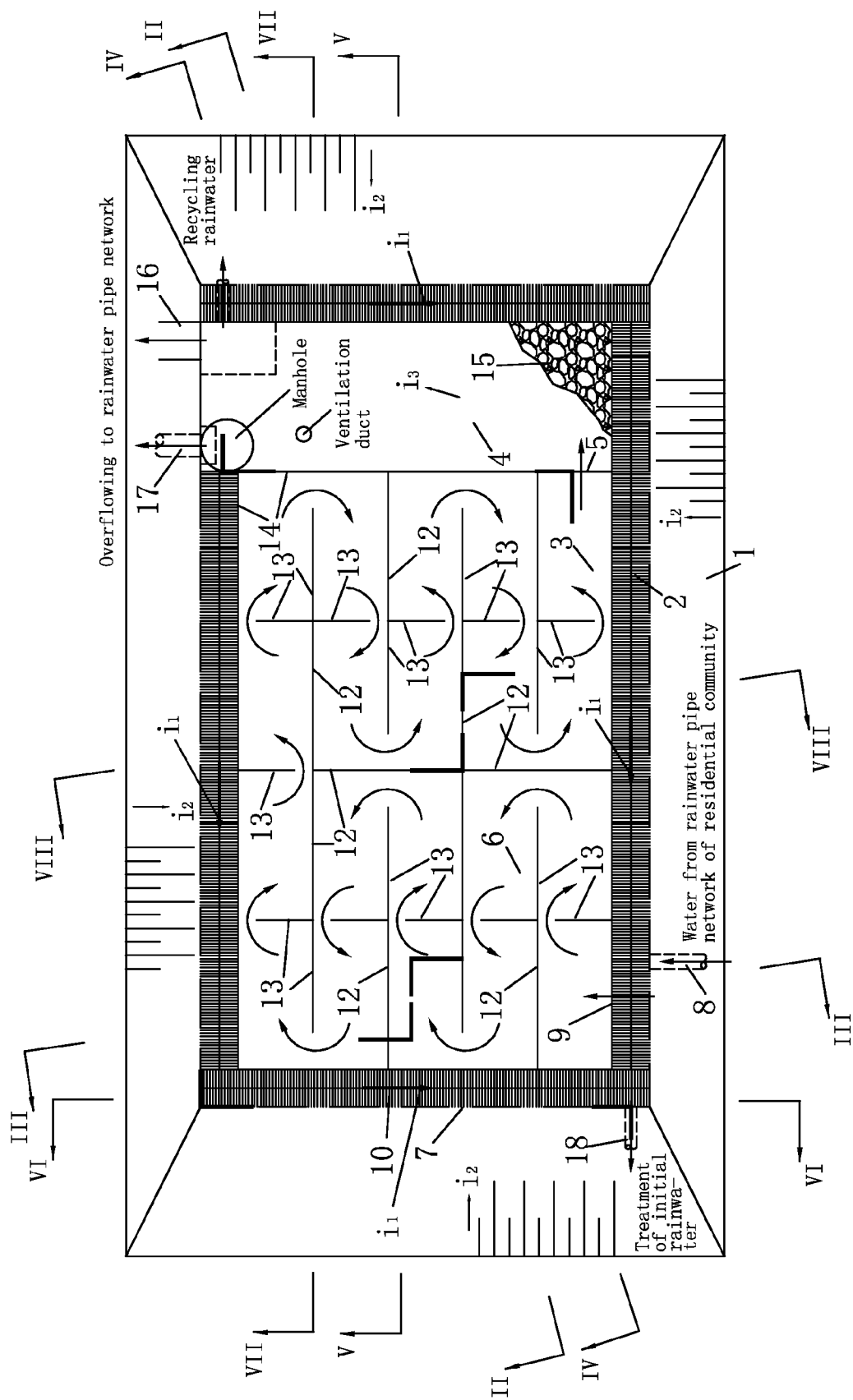
FIG. 1 is a schematic diagram of an integrated system for treating and recycling rainwater in accordance with one embodiment of the invention.
Figure 2:
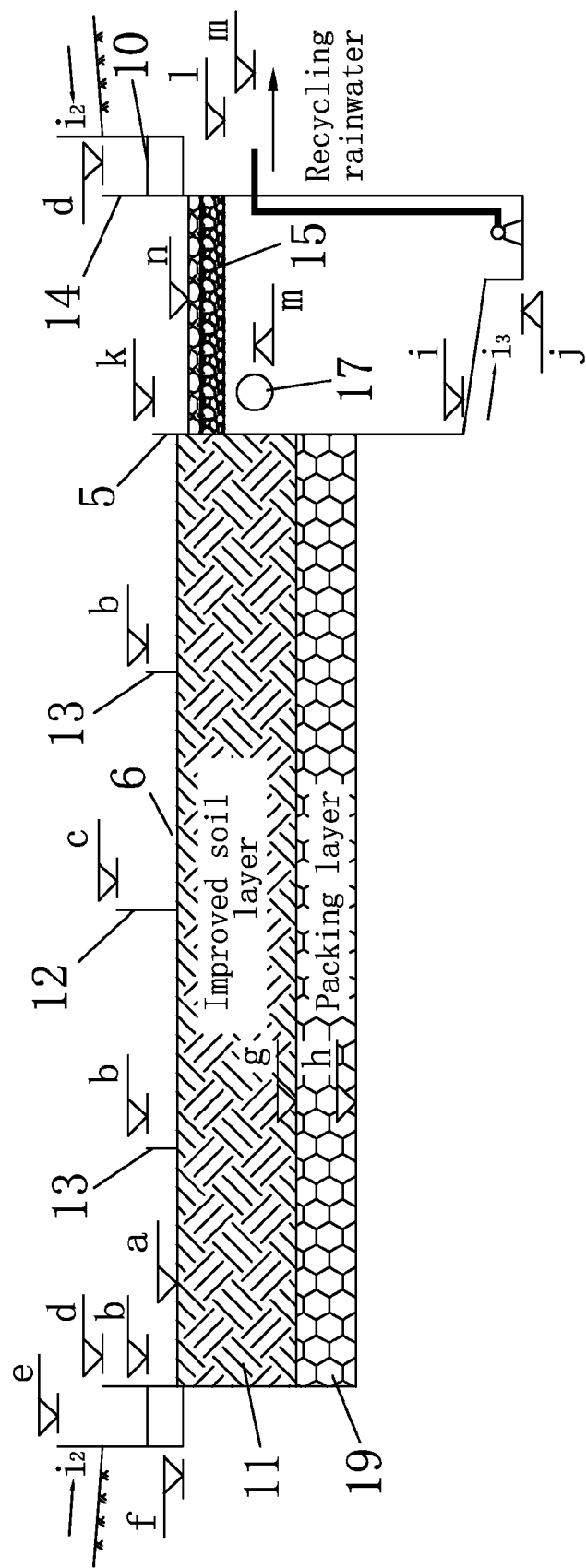
FIG. 2 is a sectional view of FIG. 1 taken from line II-II.

As shown in FIGS. 1 and 2, an integrated system for treating and recycling rainwater in a residential community comprises low-lying land 1. A primary channel 2, a baffled water treatment pool 3, and a reservoir 4 are disposed in the low-lying land 1. The primary channel 2 is annular and surrounds the baffled water treatment pool 3 and the reservoir 4. The reservoir 4 comprises an overflow wall which cuts off the annular primary channel 2. The baffled water treatment pool 3 and the reservoir 4 are adjacent to each other and are divided by a shared wall. The baffled water treatment pool 3 comprises a plurality of grid blocks 6 which are separated by inner walls. Each of the grid blocks 6 comprises gaps for allowing the rainwater to flow. Each of the grid blocks 6 is covered with vegetation. The bottom of the baffled water treatment pool 3 is provided with an improved soil layer 11 and a lower packing layer 19.

The rainwater of the residential community is preliminarily purified by the primary channel 2, and then enters the baffled water treatment pool 3, where the rainwater flows slowly and permeates into the ground, energy thereof is dissipated. Finally, the rainwater is collected, purified, and stored by the reservoir 4 for recycling.

As shown in FIGS. 1-4, the primary channel 2 comprises an external wall close to the low-lying land 1 and an inner wall opposite to the low-lying land 1. The external wall comprises a plurality of barrage-type water inlets 7 and at least one opening for communicating with a rainwater pipe outlet. The baffled water treatment pool 3 comprises a water inlet 9 which is disposed on the inner wall of the primary channel 2. The baffled water treatment pool 3 and the reservoir 4 are adjacent to each other and are divided by a shared wall. A water inlet 5 of the reservoir 4 is disposed on the shared wall. The water inlet 9 of the baffled water treatment pool 3 is a water outlet of the primary channel 2. The water inlet 5 of the reservoir 4 is a water outlet of the baffled water treatment pool 3.

Figure 3:
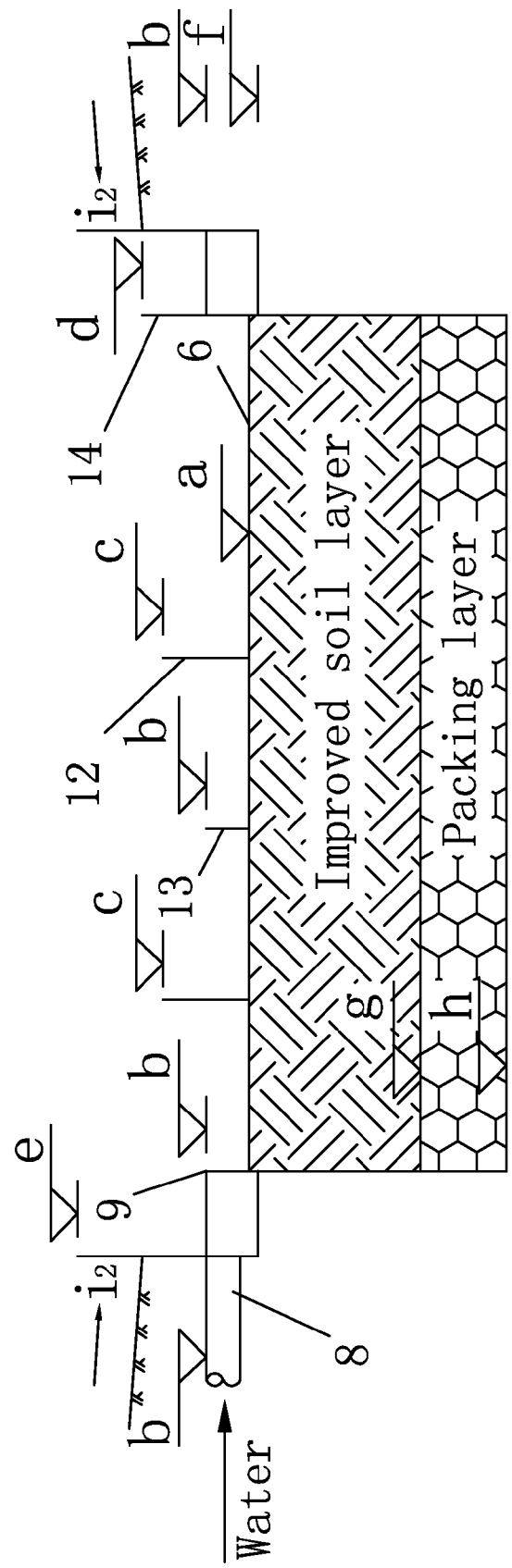
FIG. 3 is a sectional view of FIG. 1 taken from line III-III.
Figure 4:
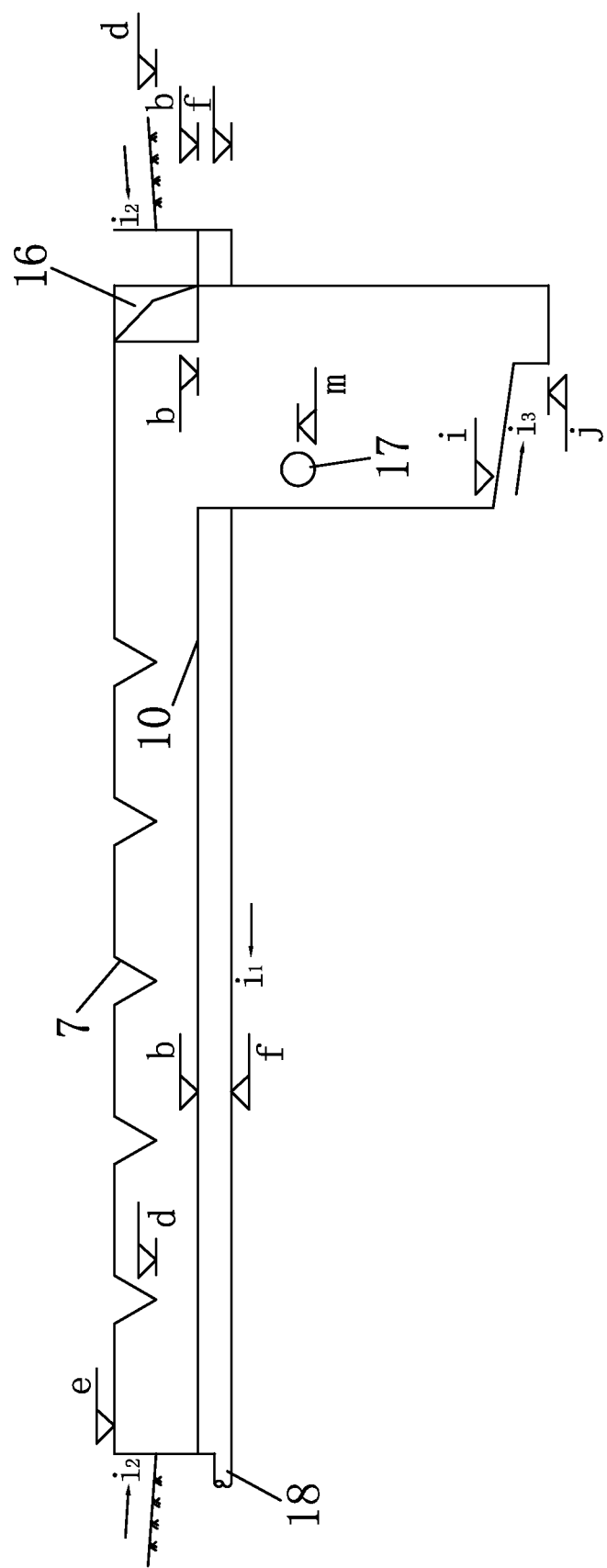
FIG. 4 is a sectional view of FIG. 1 taken from line IV-IV.
Figure 6:
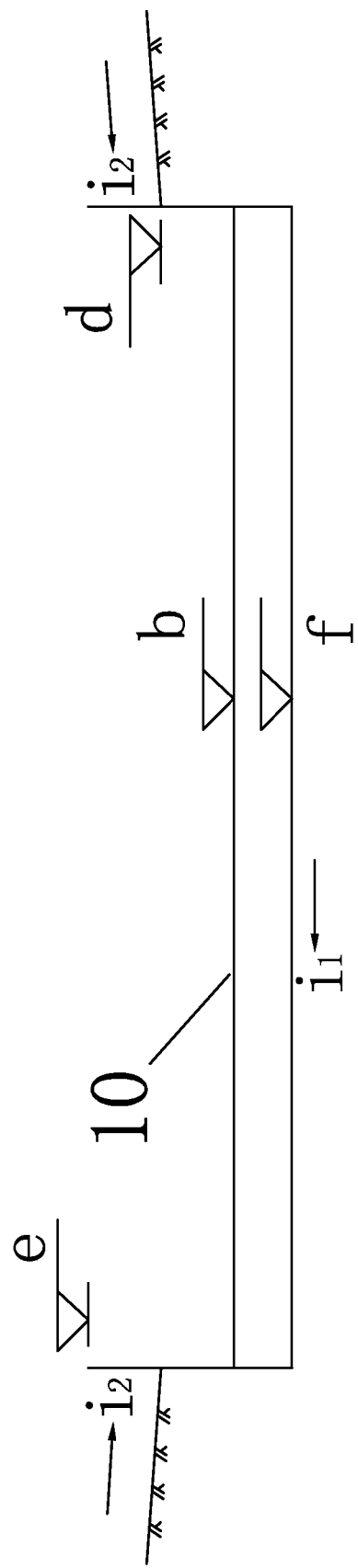
FIG. 6 is a sectional view of FIG. 1 taken from line VI-VI.

As shown in FIGS. 2 and 6, a screen 10 having the same height as the water inlet 9 of the baffled water treatment pool 3 is disposed in the primary channel 2. As shown in FIGS. 1 and 3, a rainwater pipe 8 communicates with the opening of the external wall of the primary channel 2. As shown in FIGS. 1 and 4, a water outlet 18 is disposed at a low-lying bottom of the primary channel 2. The rainwater collected by the low-lying land 1 flows through the barrage-type water inlets 7 into the integrated system, filtered by the screen 10, and enters the bottom of the primary channel 2. The rainwater collected by the rainwater pipe 8 flows into the integrated system via the opening of the external wall of the primary channel 2. The water outlet 18 of the low-lying bottom of the primary channel 2 operates to drive off the sewage accumulated at the bottom of the primary channel whereby providing relatively clean water for the baffled water treatment pool 3.

Figure 7:
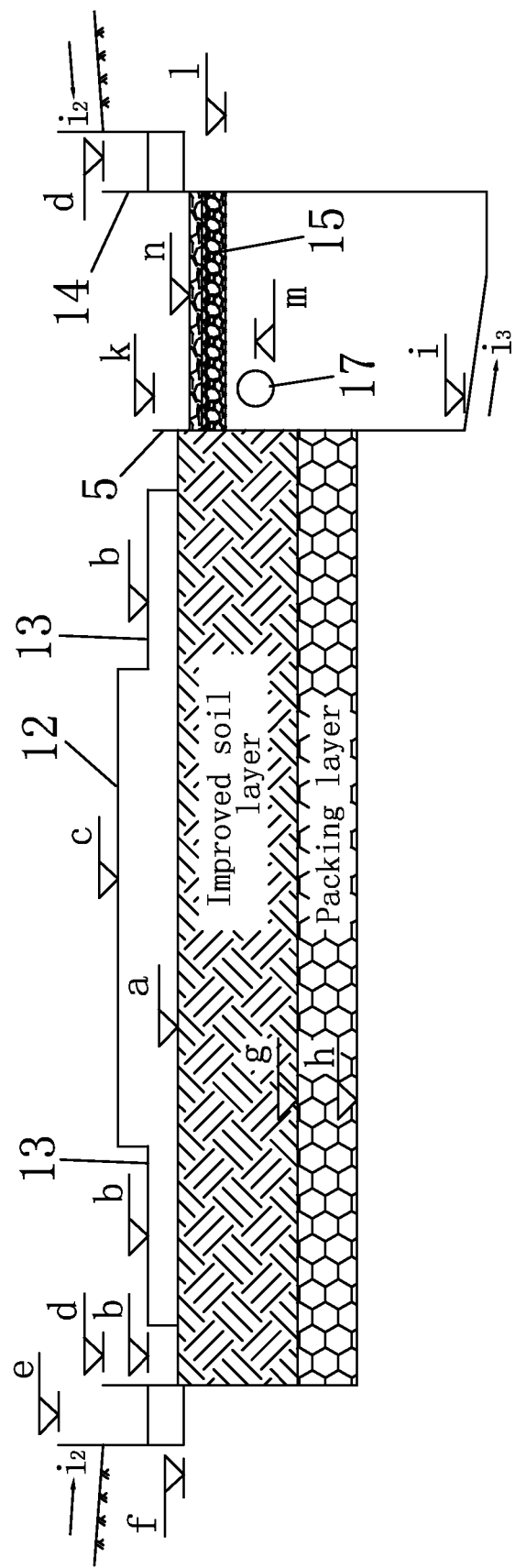
FIG. 7 is a sectional view of FIG. 1 taken from line VII-VII.
Figure 8:
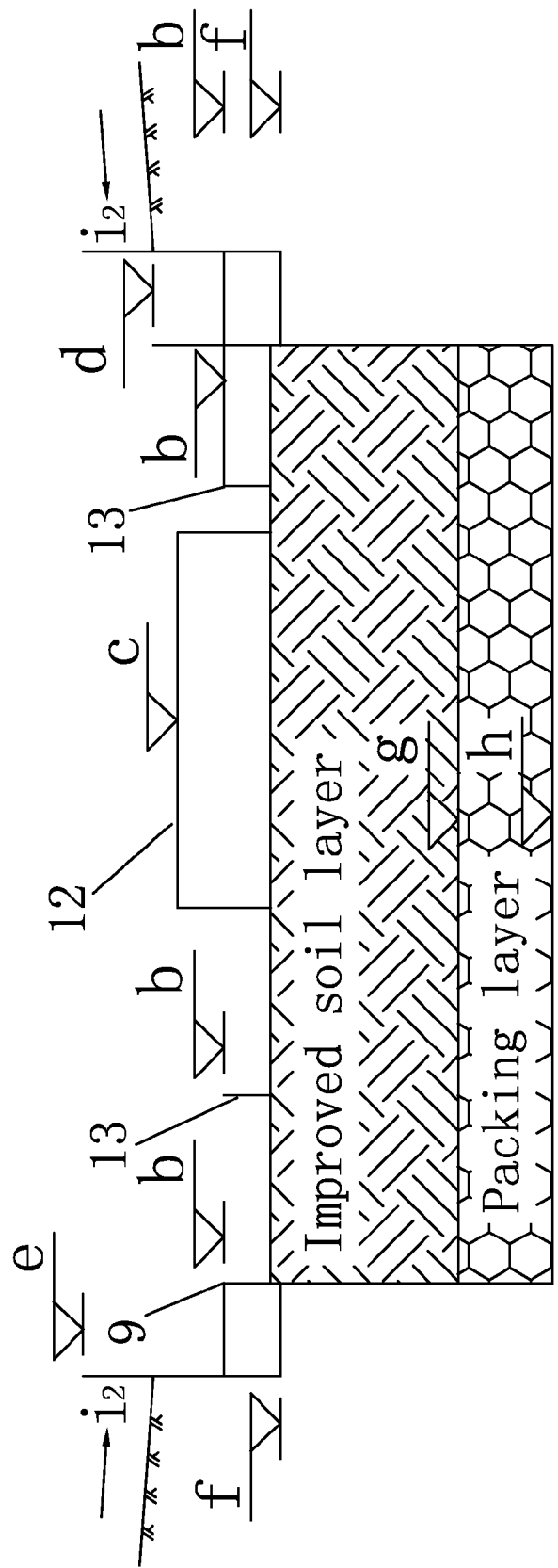
FIG. 8 is a sectional view of FIG. 1 taken from line VIII-VIII.

As shown in FIGS. 1 and 7, the baffled water treatment pool 3 comprises an external wall 14 and an inner wall comprising frame walls 12 and water distribution walls 13. The external wall 14 of the baffled water treatment pool 3 is higher than the frame walls, the frame walls are higher than the water distribution walls 13, and the water distribution walls are higher than the water inlet 5 of the reservoir 4. As shown in FIGS. 7 and 8, the gaps for allowing the rainwater to flow are disposed on the water distribution walls 13. The frame walls 12 and the water distribution walls 13 are arranged in sequence to form the grid blocks 6 of the baffled water treatment pool 3. The flow trace of the rainwater is in the form of multistage serpentine paths. The frame walls 12 operate to guide the water flow and support the integrated system. The water distribution walls 13 operate to hold and discharge water. The walls are made of pervious concrete.

The screen 10 of the primary channel 2 has the same height as the water distribution walls 13, so that the filtered water underneath the screen can flow into the baffled water treatment pool 3.

As shown in FIG. 1, the frame walls 12 and the water distribution walls 13 are arranged in sequence to form the grid blocks 6 which are rectangle, and each of the grid blocks comprises two diagonally-arranged gaps. Thus, the rainwater can be retained in the baffled water treatment pool 3 for a relatively long time for energy dissipation and permeation.

The rainwater first flows into the baffled water treatment pool 3 via the water outlet of the primary channel, and is distributed by the gaps of the water distribution walls 13 from one grid block to another, to form a push flow. Thus, the front parts of the grid blocks 6 are prevented from overloading, which is conducive to the uniform growth of the vegetation in the baffled water treatment pool 3. When the amount of rainwater exceeds the design value, water overflows, forming a mixed flow comprising push flow and multi-level flows. Thus, the retention time of the rainwater in the baffled water treatment pool 3 is prolonged, thereby facilitating the interception and permeation of the rainwater, increasing the infiltration and storage capacity of the baffled water treatment pool 3, and reducing the erosion of the rainwater against the vegetation. The treatment capacity of the baffled water treatment pool 3 is calculated according to the catchment area of the community as well as the designed rainwater treatment volume. The whole area of the baffled water treatment pool 3 can refer to the complete water balance method.

As shown in FIGS. 2, 3, 5, 7, and 8, the improved soil layer 11 and the lower packing layer 19 are separated by a geotextile. The improved soil layer 11 comprises natural soil, sand, sawdust, and molten slag, with a preferable minimum permeability coefficient exceeding $1 \times 10^{-5}$ m/s, and preferably, comprises 70 wt. % of natural soil, 20 wt. % of sand, 5 wt. % of sawdust, and 5 wt. % of molten slag. If arboreal is employed, the thickness of the improved soil player exceeds 1 meter. The packing layer 19 comprises gravel and zeolite, and has a good effect of filtration, trapping pollutants, and removal of ammonia nitrogen.

The vegetation in the baffled water treatment pool 3 is selected from both waterlogging and drought-tolerant ornamental herbaceous plants, preferably, native plants, together with an appropriate exotic species. The vegetation should have well-developed root system, strong stems and purification ability. The plants capable of growing with each other are advised so as to improve the decontamination and ornamental properties.

As shown in FIGS. 1, 2, and 8, the reservoir 4 comprises one wall shared with the baffled water treatment pool 3, one overflow wall adjacent to the low-lying land 1, and the other walls surrounded by the primary channel 2. The walls of the reservoir 4 are higher than walls of the baffled water treatment pool 3. The gravel filter layer 15 is disposed on the top of the reservoir 4. The bottom of the reservoir 4 is in the form of a step comprising an upper layer and a lower layer. The upper layer is adjacent to the water inlet 5 of the baffled water treatment pool 3 and functions as a filtering layer, and the lower layer functions as a water storage pool. The rainwater entering the reservoir 4 is first filtered by the filtering layer, and then stored in the water storage pool.

Figure 5:
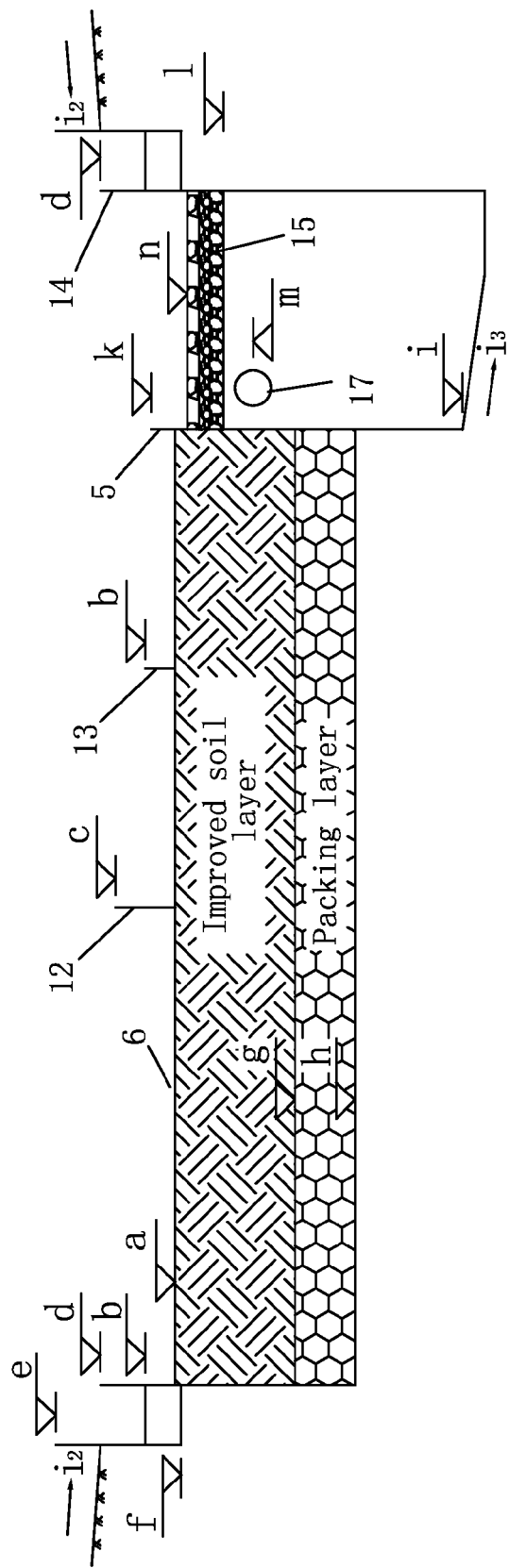
FIG. 5 is a sectional view of FIG. 1 taken from line V-V.

As shown in FIGS. 2, 5, and 7, the gravel filter layer 15 is laid on a grid plate supporting device and comprises an upper layer and a lower layer, the upper layer is filled with coarse gravels and the lower layer is filled with fine gravels, and the two layers are separated by the geotextile. The gravel filter layer 15 has good adsorption and decontamination ability.

As shown in FIG. 1, an overflow channel 16 is disposed on the overflow wall of the reservoir 4 above the gravel filter layer 15. As shown in FIGS. 1, 2, and 4, an overflow pipe 17 is disposed on the overflow wall of the reservoir 4 underneath the gravel filter layer.

The bottom of the overflow channel 16 has the same level as the top of the water distribution walls 13, and the top of the overflow channel 16 has the same level as the overflow wall. When the flow rate of the rainwater entering the reservoir 4 exceeds the permeation speed of the rainwater entering the gravel filter layer 15, the water distribution walls 13 are immersed into the rainwater, and then the rainwater overflows from the overflow channel 16 out of the integrated system, whereby ensuring the stable mixed flow comprising push flow and multi-level flows in the baffled water treatment pool 3. When the rainwater amount exceeds the preset volume of the reservoir 4, it overflows from the overflow pipe 17 out of the reservoir 4. The preset flow rate of the overflow pipe 17 should be designed to be higher than the permeation speed of the rainwater entering the gravel filter layer 15.

As shown in FIGS. 1 and 2, the gravel filter layer 15 comprises a manhole 20 and a ventilation duct, the wall of the reservoir 4 comprises a ladder, and the water storage pool comprises a water outlet pipe and a submersible pump. The manhole, ventilation duct, ladder, water outlet pipe, and the submersible pump are disposed as standards. The rainwater enters the reservoir 4 via the water inlet 5 of the reservoir 4. The rainwater is first purified by the primary channel 2, treated by the baffled water treatment pool 3, and then filtered by the gravel filter layer 15 of the reservoir 4, so the water quality stored in the reservoir 4 is pretty good. When the rainwater stored in the reservoir 4 reaches a preset discharging value, the submersible pump is started to pump the rainwater out of the integrated system for recycling as replenished groundwater, reused water, landscape water, and so on.

Example

An integrated system is disposed in low-lying land in a residential community. The integrated system comprises a primary channel which is a rectangle. The two long sides of the channel are 1 m away from the low-lying land, and the two short sides of the channel are 2 m away from the low-lying land.

The primary channel is 0.5 m in width and 1.05 m in height. A screen is disposed in the primary channel and is 0.3 m away from the bottom thereof. The barrage-type water inlets disposed on the primary channel are in the form of an inverted equilateral triangle whose side length is 0.433 m. The elevation of the rainwater pipe of the residential community communicating with the primary channel is the same as that of the screen. The preset volume of the primary channel is 9 m$^3$.

The water inlet of the baffled water treatment pool has the same width as the frame walls, and has the same elevation as the screen and the water distribution walls. The baffled water treatment pool is 8 m in length and 5 m in width, and is divided into 40 grid blocks by the frame walls and the water distribution walls. Each grid block comprises two frame walls and two water distribution walls. The external wall of the baffled water treatment pool is 0.625 m in height. The frame wall is 0.5 m in height and 2 m in length. The water distribution wall is 0.25 m in height and 0.75 m or 1.5 m in length, and the corresponding gaps are 0.25 m or 0.5 m in length. Each grid block comprises two gaps which are diagonally-arranged. The water inlet of the reservoir is 0.2 m in height. If the water inlet is immersed by the rainwater, the carrying water in the baffled water treatment pool is 8 m$^3$.

The vegetation is planted in the grid blocks. The improved soil layer comprises natural soil, sand, sawdust, and molten slag, with a minimum permeability coefficient exceeding $1\times10^{-5}$ m/s, and preferably, comprises 70 wt. % of natural soil, 20 wt. % of sand, 5 wt. % of sawdust, and 5 wt. % of molten slag. If arboreal is employed, the thickness of the improved soil player exceeds 1 meter. The packing layer 19 comprises gravel and zeolite, with a thickness of 0.5 m.

The arboreal is selected from waterlogging and drought-tolerant plants having good adaptability and resistance, such as slash pine or willow. Wetland and aquatic plants can be reeds, canna, *Juncus effusus*, or hyacinth. Two plants capable of growing with each other are advised to apply so as to improve the decontamination and ornamental properties.

The reservoir is 5.5 m in length and 2 m in width. The coarse gravels in the upper layer of the gravel filter layer have a thickness of 0.1 m. The fine gravels in the lower layer have a thickness of 0.2 m. The bottom of the gravel filter layer is 2.0 m away from the bottom of the reservoir. The effect depth of the reservoir is 1.6 m. The overflow channel is disposed at the upper right of the external wall of the reservoir, with a width of 0.5 m. The overflow pipe is disposed at the upper left of the external wall of the reservoir, and the left wall thereof is 0.2 m away from the left wall. The bottom of the overflow pipe is 0.4 m away from the bottom of the grave filter layer. The pipe diameter is nominal diameter DN300. The manhole is disposed at the upper left of the top of the reservoir, with a standard of Φ700. The ventilation duct is DN200. The water storage pool is disposed at the upper right of the bottom of the reservoir, with a length of 1.0 m, width of 0.7 m, and depth of 0.5 m. The submersible pump is disposed in the water storage pool and connected to the water outlet pipe.

In the figures, the involved reference numbers are explained as follows:

a=0.00 m; b=0.25 m; c=0.5 m; d=0.625 m; e=1.00 m; f=−0.05 m; g=−1.00 m; h=−1.50 m; i=−2.40 m; j=−2.90 m; k=0.20 m; l=−0.40 m; m=−0.65 m; n=−0.10 m; $i_1$=1.0‰; $i_2$=1.5‰; $i_3$=5‰.

The primary channel can purify the initial rainwater preliminarily. The baffled water treatment pool prolongs the retention time of water in the integrated system thereby benefiting the penetration of the rainwater into the ground. The improved soil layer and the lower packing layer disposed at the bottom of the baffled water treatment pool can filter the rainwater thereby further purifying the rainwater. The reservoir can collect, purify, store, and recycle water. Thus, the integrated system of the invention has good rainwater purification effect, can store and recycle rainwater, thereby fully utilizing the rainwater resources.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An integrated system for treating and recycling rainwater in a residential community, the residential community comprising low-lying land, the system comprising:
   a) a primary channel, the primary channel comprising a plurality of barrage-type water inlets;
   b) a baffled water treatment pool, the baffled water treatment pool comprising a first water inlet and a plurality of grid blocks, each of the plurality of grid blocks comprising gaps for allowing the rainwater to flow; and
   c) a reservoir, the reservoir comprising a second water inlet, and a gravel filter layer;
wherein
   the plurality of barrage-type water inlets is connected to the low-lying land;
   the first water inlet is connected to the primary channel;
   the primary channel, the baffled water treatment pool, and the reservoir are disposed in the low-lying land;
   the primary channel is annular and surrounds the baffled water treatment pool and the reservoir;
   the baffled water treatment pool and the reservoir are adjacent to each other;
   each of the plurality of grid blocks is covered with vegetation;
   a bottom of the baffled water treatment pool is provided with an improved soil layer and a lower packing layer;
   the gravel filter layer is disposed on a top surface of the reservoir; and
   the second water inlet is connected to the baffled water treatment pool.

2. The system of claim 1, wherein
a screen is disposed in the primary channel;
a rainwater pipe is connected to the primary channel; and
a water outlet is disposed at a low-lying bottom of the primary channel.

3. The system of claim 1, wherein
the baffled water treatment pool further comprises an external wall and an inner wall;
the inner wall comprises a plurality of frame walls and a plurality of water distribution walls;
the external wall is higher than the plurality of frame walls;
the plurality of frame walls is higher than the plurality of water distribution walls;
the plurality of water distribution walls is higher than the second water inlet;
at least one of the plurality of water distribution walls is perpendicular to one of the plurality of frame walls; and
the gaps for allowing the rainwater to flow are disposed on the plurality of water distribution walls.

4. The system of claim 3, wherein the plurality of frame walls and the plurality of water distribution walls are arranged to form the plurality of grid blocks which are rectangle, and the gaps for allowing the rainwater to flow in each of the plurality of grid blocks are two in number and diagonally-arranged.

5. The system of claim 3, wherein
the reservoir further comprises a plurality of reservoir walls;
the plurality of the reservoir walls is higher than the external wall;
a bottom of the reservoir comprises an upper layer and a lower layer;
the upper layer is adjacent to the second water inlet and functions as a filtering layer; and
the lower layer functions as a water storage pool.

6. The system of claim 5, wherein
the gravel filter layer is laid on a grid plate supporting device;
the gravel filter layer comprises a first layer, a second layer, and a geotextile layer;
the first layer is filled with coarse gravels;
the second layer is filled with fine gravels;
the first layer is disposed on a top surface of the second layer; and
the geotextile layer is disposed between the first layer and the second layer.

7. The system of claim 5, wherein the gravel filter layer comprises a manhole and a ventilation duct, the reservoir comprises a ladder, a water outlet pipe, and a submersible pump.

* * * * *